H. R. BARNHURST.
Speed Regulator.
No. 224,764. Patented Feb. 24, 1880.
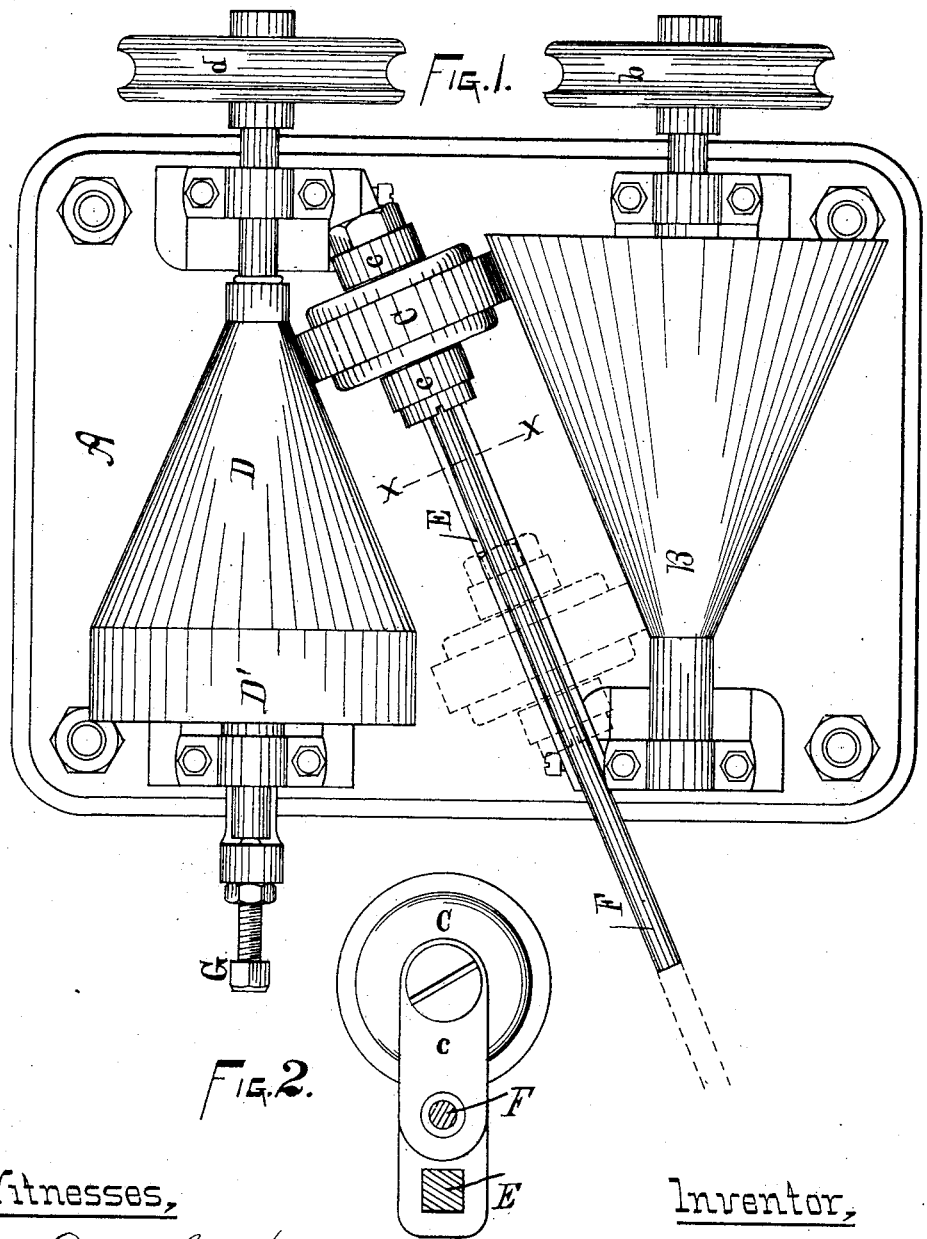

UNITED STATES PATENT OFFICE.

HENRY R. BARNHURST, OF ERIE, PENNSYLVANIA.

SPEED-REGULATOR.

SPECIFICATION forming part of Letters Patent No. 224,764, dated February 24, 1880.

Application filed November 6, 1879.

*To all whom it may concern:*

Be it known that I, HENRY R. BARNHURST, of Erie, in the county of Erie and State of Pennsylvania, have invented a new and useful Speed-Regulator; and I do hereby declare the following to be a full, clear, and exact description thereof.

My invention consists in providing a new and improved device for regulating the speed of various kinds of machinery.

The object of my invention is to provide a device whereby the speed of the machine to which it is connected may be regulated instantly and without changing the belts or gearing, and whereby the machine may be stopped entirely, if so desired.

The object, purpose, and scope of my invention will fully appear in the following general description.

My device is illustrated in the accompanying drawings as follows:

Figure 1 is a top or plan view of the device, and Fig. 2 is a section on the line and of the parts intersected by dotted line $x\ x$ in Fig. 1.

A is the base or bed plate of the device. On this plate are mounted two shafts, having cone-pulleys B and D. These cones, in place of being stepped off or ledged for the reception of a belt at various points, as is common, are made smooth, or, in other words, they are strictly cones. The shafts also bear two ordinary pulleys, $d\ d$, one of which has a belt connected with the main shaft or some other source of motion, and the other carries the transmitting-belt. Of course these pulleys $d\ d$ form no part of my invention. They may be gear-wheels or any device for receiving and transmitting motion.

The means of communication from one cone to the other is a friction-wheel, C, which may be of any proper construction. This friction-wheel is mounted on a movable journal-box, which is adapted to slide on a guide or track, E, on or near the bed-plate.

F is a rod connected with the sliding journal-box $c$, and by it the journal-box is moved by pushing or pulling the said rod. By these means the friction C can be made to traverse from end to end of the cones, and hence can be made to transmit motion from any part of one cone to a similar part of the other cone, and thus regulate the speed of the cone to which motion is transmitted, and through it regulate the speed of the machine attached to it.

Any means may be used for pushing in and pulling out the rod F—as, for example, a lever or a system of levers, which may be operated upon by the hand, foot, or knee, as desirable—and, if desired, of course the rod F can be actuated directly by the hand or by a screw.

The movement of the friction C must be on a line parallel with the sides of the cone, as is shown. If one of the cones is cut away, as at D' on the cone D, the machine can be stopped by drawing the friction back to the point indicated by dotted lines in the drawings, for at that point the friction will only be in contact with one of the cones.

G is a set-screw operating upon the shaft of the cone D, by which means the wear of the cones or friction can be taken up, and also the tension or traction of the parts can be regulated.

A spring should be provided to keep the shaft well up against the screw G, so as to prevent lateral play.

I do not wish to be limited to any means for mounting and traversing the friction, as it is obvious that it may be accomplished in various ways, which will readily suggest themselves to a mechanic.

The gist of my invention consists in substituting the movable friction acting upon smooth cones for a belt acting upon ledged cones. By making this change I am enabled to provide means whereby the transmitter (the friction C) can be almost instantly changed from a position which will give slow motion to a position which will give fast motion, or to any intermediate point.

It is obvious that one of the cones might be omitted and the friction C be used as a pulley, or operate upon a plain pulley, with much the same result.

What I claim is—

1. The combination, with the cones B and D and friction-pulley C, of means, substantially as described, whereby one of said cones can be adjusted laterally, so as to take up wear and regulate traction, as set forth.

2. In combination with one of the cones and the friction-transmitter of a speed-regulator, the companion cone having part of its face cut away, substantially as and for the purposes mentioned.

In testimony whereof I, the said HENRY R. BARNHURST, have hereunto set my hand.

HENRY R. BARNHURST.

Witnesses:
JNO. K. HALLOCK,
FRANK H. BALL.